(12) United States Patent
Feng et al.

(10) Patent No.: US 9,986,205 B2
(45) Date of Patent: May 29, 2018

(54) METHOD AND DEVICE FOR DETECTING VIDEO CONFERENCE HOTSPOT SCENARIO

(71) Applicant: ZTE CORPORATION, Shenzhen, Guangdong Province (CN)

(72) Inventors: Bin Feng, Shenzhen (CN); Xiaoyan Luo, Shenzhen (CN); Mu Liu, Shenzhen (CN); Cunwang Zhu, Shenzhen (CN); Xianfeng Xu, Shenzhen (CN); Dingzhun Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days. days.

(21) Appl. No.: 15/322,733

(22) PCT Filed: Dec. 26, 2014

(86) PCT No.: PCT/CN2014/095180
§ 371 (c)(1),
(2) Date: Mar. 8, 2017

(87) PCT Pub. No.: WO2016/000429
PCT Pub. Date: Jan. 7, 2016

(65) Prior Publication Data
US 2017/0187989 A1 Jun. 29, 2017

(30) Foreign Application Priority Data
Jun. 30, 2014 (CN) .......................... 2014 1 0304990

(51) Int. Cl.
*H04N 7/15* (2006.01)
*G06F 17/30* (2006.01)

(52) U.S. Cl.
CPC ........... *H04N 7/15* (2013.01); *G06F 17/3082* (2013.01); *G06F 17/30787* (2013.01)

(58) Field of Classification Search
None
See application file for complete search history.

(56) References Cited

U.S. PATENT DOCUMENTS

| 2005/0210105 | A1 | 9/2005 | Hirata et al. | |
| 2010/0066804 | A1* | 3/2010 | Shoemake | H04N 7/147 348/14.02 |

(Continued)

FOREIGN PATENT DOCUMENTS

| CN | 101398826 A | 4/2009 |
| CN | 101420579 A | 4/2009 |

(Continued)

*Primary Examiner* — Creighton Smith
(74) *Attorney, Agent, or Firm* — Ling Wu; Stephen Yang; Ling and Yang Intellectual Property

(57) ABSTRACT

A method and apparatus for detecting a hotspot scene of a video conference are provided. The method includes: a plurality of video receivers recognize in real time and perform statistics on specific behavior, including at least one of a discussion behavior, screen watching behavior and handclap behavior, of various viewers at a video conference site according to video data at video conference site; the video receivers judge, according to statistics, whether a frequency at which or a time length for which various viewers at video conference site perform the specific behavior, exceeds a first preset value; the video receivers send the video sender time period of the video played at video conference site, for which a result of the judgment is that the first preset value is exceeded; and the video sender determines a hotspot scene of the played video according to the time periods sent by the video receivers.

13 Claims, 5 Drawing Sheets

(56) References Cited

U.S. PATENT DOCUMENTS

| | | | |
|---|---|---|---|
| 2010/0194988 A1 | 8/2010 | Takaoka et al. | |
| 2013/0108244 A1* | 5/2013 | Konuma | G10L 25/87 386/285 |
| 2014/0304724 A1* | 10/2014 | Shin | H04N 21/442 725/10 |
| 2015/0319677 A1* | 11/2015 | Colban | H04W 48/16 370/338 |

FOREIGN PATENT DOCUMENTS

| | | |
|---|---|---|
| CN | 103607612 A | 2/2014 |
| EP | 2597868 A1 | 5/2013 |
| EP | 2709357 A1 | 3/2014 |

* cited by examiner

US 9,986,205 B2

METHOD AND DEVICE FOR DETECTING VIDEO CONFERENCE HOTSPOT SCENARIO

TECHNICAL FIELD

The present disclosure relates to the field of communications, and in particular to a method and an apparatus for detecting a hotspot scene of a video conference.

BACKGROUND

In video conferences or live broadcastings, the identification and search keywords of a hotspot scene or highlight piece are manually performed by the sender or manager of a video. Since a video conference or live broadcasting lasts a relatively long period of time, the identification of a hotspot scene of a video conference or live broadcasting after the video conference or live broadcasting will consume a great quantity of manpower and material resources., However, the identification of a hotspot scene during the course of the video conference or live broadcasting, requires the sender or manager of a video to be highly focused during the whole process of the video conference or live broadcasting, which conflicts with the job of the video sender or manager in guaranteeing the proceeding of a video conference or devices for the video conference or living broadcasting.

No effective solutions have been proposed to address the problem existing in the related technology that the identification of a hotspot scene consumes human cost.

SUMMARY

The present disclosure provides a method and an apparatus for detecting a hotspot scene of a video conference to at least address the problem existing in the related technology that the identification of a hotspot scene consumes human cost.

In accordance with an aspect of the present disclosure, a method for detecting a hotspot scene of a video conference is provided which includes the following steps. Each of a plurality of video receivers recognizes, in real time, and makes statistics on specific behavior of various viewers at a video conference site according to the video data played at the video conference site, herein the specific behavior includes at least one of: a discussion behavior, a screen watching behavior and a handclap behavior. Each of the plurality of video receivers judges, according to the statistics, whether a frequency at which or a time length for which various viewers at the video conference site perform the specific behavior, exceeds a first preset value. Each of the plurality of video receivers sends the video sender a period of play time of the video played at the video conference site, for which a result of the judgment is that the first preset value is exceeded; and the video sender determines a hotspot scene of the video played according to a plurality of periods of play time sent by the plurality of video receivers.

In an exemplary embodiment, the step that the video sender determines a hotspot scene of the video played according to the plurality of periods of play time sent by the plurality of video receivers includes that: the video sender receives the plurality of periods of play time sent by the plurality of video receivers; the video sender judges whether a percent of video receivers sending an identical period of play time exceeds a second preset value; and when determining that a judgment result is that the second preset value percent is exceeded, the video sender sends the identical period of play time to the plurality of video receivers, herein the video played in the identical period of play time is determined as the hotspot scene.

In an exemplary embodiment, after the plurality of video receivers receive the identical period of play time, the method further includes the following steps. The plurality of video receivers perform a voice recognition on first voice data played at the video conference sites in the identical period of play time. The plurality of video receivers make statistics on the frequency at which each word recognized by the voice recognition appears in the first voice data played at the video conference sites. The plurality of video receivers send the video sender words which appear in the identical period of play time at a frequency exceeding a third preset value as search keywords of the video played in the identical period play time.

In an exemplary embodiment, the method further includes the following steps. The video sender performs a voice recognition on the second voice data of the video played in the identical period of play time. The video sender performs statistics on the frequency at which each word recognized by the voice recognition appears in the second voice data of the played video. And the video sender determines the words which appear in the identical period of play time at a frequency exceeding a fourth preset value as search keywords of the video played in the identical period of play time.

In an exemplary embodiment, after the video sender receives first search keywords sent by the plurality of video receivers and determines second search keywords according to the fourth preset value, the method further includes that: the video sender determines words which belong to both the first search keywords and the second search keywords, as search keywords of the video played in the identical period of play time.

In an exemplary embodiment, the step that each of the plurality of video receivers judges, according to the statistics, whether a frequency at which or a time length for which various viewers at a video conference site perform the specific behavior, exceeds a first preset value includes that: each of the plurality of video receivers judges whether the duration of the specific behavior performed by the viewers at a video conference site and/or the percent of the viewers performing the specific behavior at the corresponding video conference site exceed/exceeds the first preset value.

In an exemplary embodiment, the method further includes the following steps. The plurality of video receivers judges whether the duration of the specific behavior performed by the viewers at a video conference site and/or the percent of the viewers performing the specific behavior at the video conference site exceed/exceeds the first preset value, respectively, and/or the plurality of video receivers judges whether the duration of the specific behavior performed by the viewers at a video conference site and/or the percent of the viewers performing the specific behavior at the video conference site are/is smaller than a fifth preset value, respectively. The ones of the plurality of the video receivers who obtain the following result send the video data and/or audio data played at video conference sites to the video sender: the duration of the specific behavior performed by the viewers at a video conference site and/or the percent of the viewers performing the specific behavior at the video conference site exceed/exceeds the first preset value, and/or the duration of the specific behavior performed by the viewers at a video conference site and/or the percent of the viewers performing the specific behavior at the video conference site are/is smaller than the fifth preset value.

In an exemplary embodiment, the method further includes the following steps. The plurality of video receivers judges whether words, which appear in the first voice data at a frequency exceeding the third preset value, and the appearance frequencies thereof are matched with the words, which appear in the second voice data at a frequency exceeding the fourth preset value, and the appearance frequencies thereof, respectively. The plurality of video receivers determines, according to the result of the judgment, whether the viewers at a video conference site make a positive reaction to the video played in the identical period of play time. And the plurality of video receivers sends the result of the judgment to the video sender.

In accordance with another aspect of the present disclosure, an apparatus for detecting a hotspot scene of a video conference is provided which is located at the place of a video receiver and includes the following modules. A processing module is arranged to recognize, in real time, specific behavior of various viewers at a video conference site according to the video data played at the video conference site and perform statistics on the specific behavior, herein the specific behavior includes at least one of: a discussion behavior, a screen watching behavior and a handclap behavior. A judgment module is arranged to determine, according to the statistics, whether a frequency at which or a time length for which various viewers at the video conference site perform the specific behavior, exceeds a first preset value. And a sending module is arranged to send a period of play time of the video played at the video conference site, for which a result of the judgment is that the first preset value is exceeded, to a video sender, herein the video sender determines a hotspot scene of the video played according to the plurality of periods of play time sent by the plurality of video receivers.

In an exemplary embodiment, the judgment module is also arranged to determine whether the duration of the specific behavior performed by the viewers at the video conference site and/or the percent of the viewers performing the specific behavior at the video conference site exceed/exceeds the first preset value.

In the present intention, as each of a plurality of video receivers recognizes, in real time, specific behavior of various viewers at a video conference site according to the video data played at the video conference side and performs statistics on the specific behavior, herein the specific behavior includes at least one of: a discussion behavior, a screen watching behavior and a handclap behavior. Each of the plurality of video receivers determines, according to the statistics, whether a frequency at which or a time length for which various viewers at a video conference site perform the specific behavior, exceeds a first preset value. The video receiver at a video conference site sends the video sender the period of play time of the video played at the video conference site, for which a result of the judgment is that the first preset value is exceeded. And the video sender determines a manner of a hotspot scene of played the video according to the plurality of periods of play time sent by the plurality of video receivers. The problem existing in the related technology that the identification of a hotspot scene consumes human cost is addressed, thereby improving the efficiency of hotspot scene identification.

It shall be illustrated that the summary is provided to introduce, in a simplified way, a selection of concepts that are further described below in the detailed description. The summary is not intended to identify key features or necessary features of the claimed subject matter, nor is it intended to be used to limit the scope of the claimed subject matter. Furthermore, the claimed subject matter is not limited to implementations that solve any or all disadvantages mentioned in any part of the present disclosure.

DESCRIPTION OF DRAWINGS

The accompanying drawings described herein which form a part of the application are provided for a better understanding of the present disclosure. Exemplary embodiments of the present disclosure and the description of the exemplary embodiments serve to illustrate the present disclosure but are not to be construed as improper limitations to the present disclosure. In the accompanying drawings.

SPECIFIC EMBODIMENTS

It shall be illustrated that the embodiments of the present disclosure and the features thereof can be combined with each other if no conflict is caused. The present disclosure will be described below in detail with reference to accompanying drawings when read in conjunction with specific embodiments.

The steps shown in accompanying flowcharts can be executed in a computer system of, for example, a set of computer-executable instructions, moreover, although certain logic sequences are shown in the flowcharts, the steps shown or described may be executed in sequences different from those shown herein in some cases.

Figure 1:
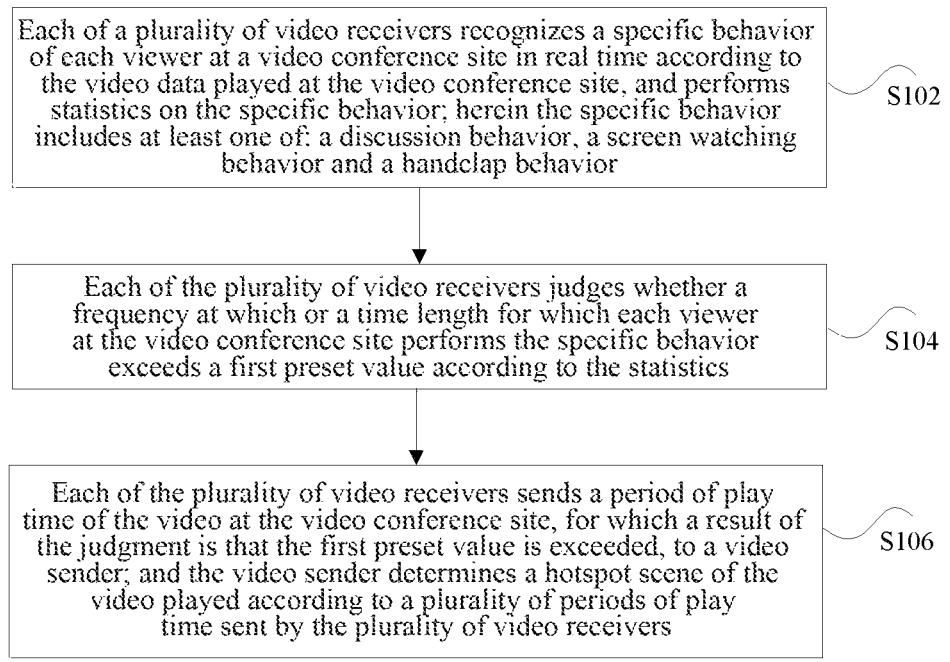
FIG. 1 is a flowchart of a method for detecting a hotspot scene of a video conference according to an embodiment of the present disclosure.

An apparatus for detecting a hotspot scene of a video conference is provided in an embodiment of the present disclosure. FIG. 1 is a flowchart illustrating the flow of an apparatus for detecting a hotspot scene of a video conference according to an embodiment of the present disclosure. As shown in FIG. 1, the flow includes the following steps.

In step S102, each of a plurality of video receivers recognizes, in real time, specific behavior of various viewers at a video conference site according to the video data played at the video conference site and performs statistics on the specific behavior, herein the specific behavior includes at least one of: a discussion behavior, a screen watching behavior and a handclap behavior.

In step S104, each of the plurality of video receivers determines, according to the statistics, whether a frequency at which or a time length for which various viewers at a video conference site perform the specific behavior, exceeds a first preset value.

In step S106, each of the plurality of video receivers sends the video sender a period of play time of the video at the video conference site, for which a result of the judgment is that the first preset value is exceeded; and the video sender determines a hotspot scene of the video played according to the plurality of periods of play time sent by the plurality of video receivers.

By executing the foregoing steps to determine the hotspot scene of the video played at video conference sites according to the specific behavior performed by audience at video conference sites, the present disclosure addresses the problem existing in the related technology that the identification of a hotspot scene consumes human cost, thereby improving the efficiency of hotspot scene identification.

In an exemplary embodiment, in specific implementations, the process that the video sender determines a hotspot scene of the video played according to the plurality of periods of play time sent by the plurality of video receivers may use the manner as follows: the video sender receives the plurality of periods of play time sent by the plurality of video receivers; the video sender judges whether a radio of video receivers sending identical period of play time to the plurality of video receivers exceeds a second preset value; and when determining that a judgment result is that a second preset value is exceeded, the video sender sends the identical period of play time to the plurality of video receivers, herein the video played in the identical period of play time is determined as a hotspot scene. For example, the period of play time of the video is determined as a hotspot scene of the video conference or living broadcasting if percent of viewer places where the period of play time of the video is judged as a hotspot scene exceeds a certain threshold (e.g., 80%) of all viewer places.

In an exemplary embodiment, after the video sender sends the identical period of play time to the plurality of video receivers, that is, after the video played in the identical period of play time is determined as a hotspot scene, the search keywords of the hotspot scene may be determined to facilitate the future search of the hotspot scene. Three search keyword determination manners are provided in the present embodiment, including:

Manner 1: Search Keywords are Determined by the Video Receivers.

For example, the plurality of video receivers perform a voice recognition on the first voice data played at the video conference sites in the identical period of play time; the plurality of video receivers make statistics on the frequency at which each word recognized by the voice recognition appears in the first voice data played at the video conference sites; and the plurality of video receivers determine that the words appearing in the identical period of play time at a frequency exceeding a third preset value are search keywords of the video played in the identical period of play time and then send the search keywords to the video sender.

Manner 2: Search Keywords are Determined by the Video Sender

For example, the video sender performs a voice recognition on the second voice data of the video played in the identical period of play time; the video sender makes statistics on the frequency at which each word recognized by the voice recognition appears in the second voice data of the video played; and the video sender determines the words appearing in the identical period of play time at a frequency exceeding a fourth preset value as the search keywords of the video played in the identical period of play time.

Manner 3: Search Keywords are Determined Jointly by the Video Receives and the Video Sender.

For example, after receiving first search keywords from the plurality of video receivers and determining second search keywords according to the fourth preset value, the video sender determines the words which belong to both the first search keywords and the second search keywords as the search keywords of the video played in the identical period of play time.

In an exemplary embodiment, step S104 includes that: each of the plurality of video receivers determines whether the duration of the specific behavior performed by the viewers at a video conference site and/or the percent of the viewers performing the specific behavior at the video conference site exceed/exceeds the first preset value.

In an exemplary embodiment, in the foregoing implementations, the method may further include the following steps. Each of the plurality of video receivers determines whether the duration of the specific behavior performed by the viewers at a video conference site and/or the percent of the viewers performing the specific behavior at the video conference site exceed/exceeds the first preset value respectively, and/or each of the plurality of video receivers determines whether the duration of the specific behavior performed by the viewers at a video conference site and/or the percent of the viewers performing the specific behavior at the video conference site are/is smaller than a fifth preset value respectively . And the ones of the video receivers who obtain the following result send the video data and/or audio data played at video conference sites to the video sender: the duration of the specific behavior performed by the viewers at a video conference site and/or the percent of the viewers performing the specific behavior at the video conference site exceed/exceeds the first preset value, and/or the duration of the specific behavior performed by the viewers at a video conference site and/or the percent of the viewers performing the specific behavior at the video conference site are/is smaller than a fifth preset value. In this way, the video sender can know, in real time, the degree of enthusiasm of each video sender (that is, each video conference site) reacting to the played video.

In an exemplary embodiment, in the foregoing implementations, the method further includes the following steps. Each of the plurality of video receivers judges whether the words, appearing in the first voice data at a frequency exceeding the third preset value, and the appearance frequencies thereof are matched with the words, appearing in the second voice data at a frequency exceeding the fourth preset value, and the appearance frequencies thereof. Each of the plurality of video receivers determines, according to the result of the judgment, whether the viewers at a corresponding video conference site make a positive reaction to the video played in the identical period of play time. And each of the plurality of video receivers sends the result of the determination to the video sender. In this way, the video sender can know, in real time, whether a positive reaction is made from each video conference site to the video played.

In the present embodiment of the present disclosure, an apparatus for detecting a hotspot scene of a video conference is further provided, which is located in the video receivers. The apparatus which is arranged to realize the foregoing method for detecting a hotspot scene of a video conference can be described and understood in combination with the foregoing method embodiments and is therefore not described here repeatedly.

Figure 2:
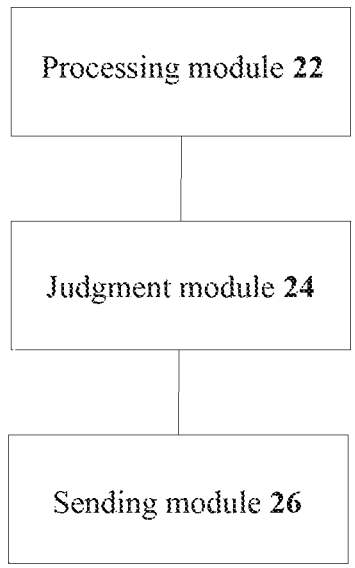
FIG. 2 is a schematic diagram of a structure of an apparatus for detecting a hotspot scene of a video conference according to an embodiment of the present disclosure.

FIG. 2 is a schematic diagram of a structure of an apparatus for detecting hotspot scenes of a video conference according to an embodiment of the present disclosure. As shown in FIG. 2, the apparatus includes a processing module 22, a determination module 24 and a sending module 26. Herein, the processing module 22 is arranged to recognize, in real time, specific behavior of various viewers at a video conference site according to the video data played at the video conference site and perform statistics on the specific behavior. Herein, the specific behavior includes at least one of: a discussion behavior, a screen watching behavior and a handclap behavior. The judgment module 24 coupled with the processing module 22 is arranged to determine, according to the statistics, whether a frequency at which or a time length for which various viewers at the video conference site perform the specific behavior, exceeds a first preset value. And the sending module 26 coupled with the determination module 24 is arranged to send the video sender the period of play time of the video played at the video conference site, for which a result of the judgment is that the first preset value is exceeded. Herein, the video sender determines a hotspot scene of the video played according to the plurality of periods of play time sent by the plurality of video receivers.

The modules and the units involved in embodiments of the present disclosure can be implemented in software or hardware. The modules and the units described herein may be arranged in a processor, for example, it may be described like this: a processor includes a processing module 22, a judgment module 24 and a sending module 26. Herein the names of the modules are not construed as limitations to the modules in some cases, for example, the processing module 22 may also be depicted as "a module for performing real-time recognition and statistics on specific behavior of various viewers at a video conference site according to the video data played at a video conference site".

In an exemplary embodiment, the judgment module 24 is also arranged to judge whether the duration of the specific behavior performed by the viewers at a video conference site and/or the percent of the viewers performing the specific behavior at the video conference site exceed/exceeds the first preset value.

In an exemplary embodiment, the apparatus may further include a second judgment module and the following modules and a second sending module. The second judgment module arranged to judge whether the duration of the specific behavior performed by the viewers at the video conference site and/or the percent of the viewers performing the specific behavior at the video conference site exceed/exceeds the first preset value, and/or judge whether the duration of the specific behavior performed by the viewers at the video conference site and/or the percent of the viewers performing the specific behavior at the video conference site are/is smaller than a fifth preset value. And the second sending module coupled with the second judgment module is arranged to send the video data and/or the audio data played at the video conference site to the video sender. Herein, the second sending module sends the video data and/or the audio data on the condition that the duration of the specific behavior performed by the viewers at the video conference site and/or the percent of the viewers performing the specific behavior at the video conference site exceed/exceeds the first preset value, and/or the duration of the specific behavior performed by the viewers at the video conference site and/or the percent of the viewers performing the specific behavior at the video conference site are/is smaller than a fifth preset value.

To make the technical solutions and the implementations of the present disclosure more apparent, the implement process of the present disclosure will be described in detail in conjunction with alternative embodiments.

A method for detecting and retrieving a hotspot scene of a video conference or live broadcasting is provided in the alternative embodiment. The method is used to recognize, in real time, the reaction of a video viewer to a video during the process of a video conference or living broadcasting to determine a hotspot scene and automatically generate search keywords of the hotspot scene, and includes one of the following characteristics.

1. Behaviors of one or more video viewers are analyzed in real time to recognize the reactions of the viewers to the video, for example, the discussion of the viewers about the video, the stare of the viewers at the video or the handclap of the viewers for the video, then a video segment to which the viewers respond intensively is determined as a hotspot scene while the time of appearance of the hotspot scene in the video is obtained. The voice recognition is performed on the audio data of the hotspot scene, the frequency at which each word recognized by the voice recognition appears is counted, and the words appearing frequently are determined as search keywords of the hotspot scene.

2. Reactive behaviors of the viewers to the video, for example, the discussion made by the viewers about the video, the stare of the viewers at the video or the handclap of the viewers for the video, are recognized; and the device such as an image sensor, a depth sensor or the like is locally arranged at one or more places where the current video is watched to acquire, in real time, the reactive behaviors of the viewers to the video and analyze and recognize the reactive behavior.

3. Reactive behaviors of the viewers to the video are recognized and matched with a template to judge whether the current reactive behavior is a discussion behavior, a stare behavior or a handclap behavior.

4. If it is determined that the reactive behavior is matched with the foregoing template, then the duration of the reactive behavior or the percent of the viewers performing the reactive behavior is tracked. If the duration of the reactive behavior or the percent of the viewers performing the reactive behavior exceeds a certain threshold, then it is considered that viewers are interested in the video segment, consequentially, the video segment is determined as a hotspot scene, and the temporal position of the video segment in the video conference or live broadcasting is recorded.

5. The voice recognition is performed on the audio data included in the detected hotspot scene, the frequency at which each recognized word appears is counted, and the words appearing frequently are determined as search keywords of the hotspot scene.

6. In a video conference or live broadcasting, the device such as a voice sensor or the like is locally arranged at one or more places where the current video is watched to acquire, in real time, the reactive voices of the viewers to the video. After a hotspot scene is detected, the period of play time of the hotspot scene and the reactive voices of the viewers to the video are recognized synchronously, and the frequency at which each recognized word appears is counted, and the words appearing frequently are determined as search keywords of the hotspot scene.

7. After the audio data of the current video and the reactive voices of the viewers during the period of play time of the hotspot scene are acquired, the audio data of the hotspot scene and the reactive voices of the viewers are analyzed synchronously, and the frequency at which each recognized word appears is counted, and the words which appear frequently in both the audio data of the hotspot scene and the reactive voices of the viewers are selected as search keywords of the hotspot scene.

8. In the period of play time of the hotspot scene, the duration of a certain reactive behavior or the percent of the viewers performing the certain reactive behavior is analyzed, and the viewers reacting strongly or indifferently are presented for the video sender in a proper manner so that the video sender may know the feeling of the viewers about the current video more directly to make a corresponding adjustment.

9. In the period of play time of the hotspot scene, the audio data of the hotspot scene and the reactive voices of the viewers are analyzed synchronously, and the frequency at which each recognized word appears is counted, and the 3-5 words appearing most frequently the audio data of the hotspot scene are selected. Compared with the 3-5 words appearing most frequently the reactive voices of the viewers, if the words selected from the audio data of the hotspot scene and the appearance frequencies thereof are approximate to those selected from the reactive voices of the viewers and the appearance frequencies thereof, respectively, then it is considered that the viewers make a positive reaction to the hotspot scene. Otherwise, it is considered that the viewers make a negative reaction or make no reaction to the hotspot scene. The forgoing result of the statistics is fed back to the video sender in a proper manner so that the video sender makes a corresponding adjustment.

10. The forms of the presentation of the one or more viewers selected according to the reactive behaviors or voices of viewers for the video sender include: real-time text display, text log, a video record in the period of play time and real-time video display, etc. The video sender may also select to show the viewers a video of viewers.

Herein, the descriptions and explanations of the foregoing characteristics can be combined with each other without no conflict.

Figure 3:
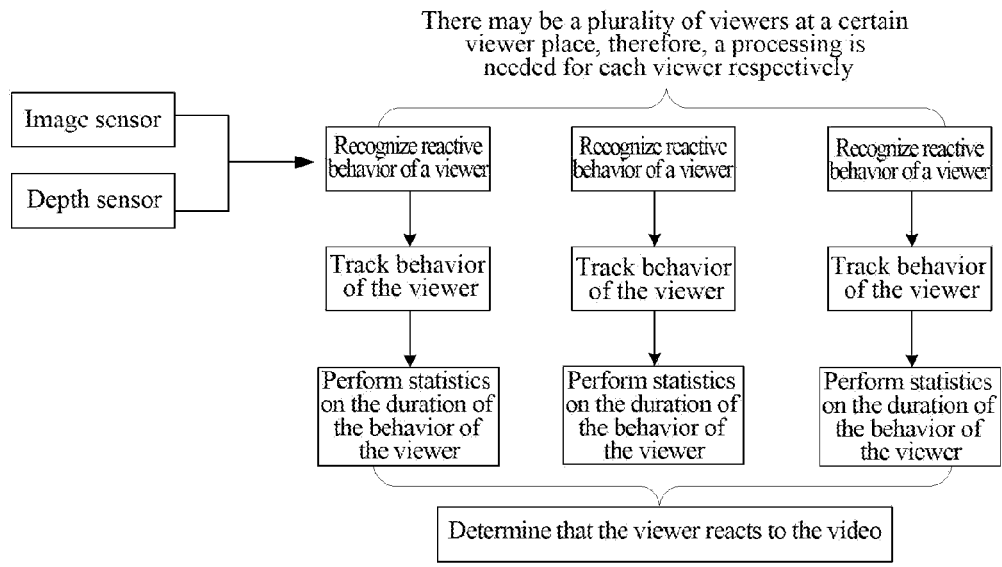
FIG. 3 is a flowchart 1 of a method for detecting a hotspot scene of a video conference according to an alternative embodiment of the present disclosure.

In an exemplary embodiment, as shown in FIG. 3, there may be one or more viewers at a certain viewer place, but generally, there is only one image sensor and one depth sensor at a viewer place. The image sensor and the depth sensor collect, in real time, the images and the depth information of various viewers at the viewer place. The system first detects and tracks the face, the hands and the eyes of a viewer and then analyzes the movement or the activity of the face, the hands and the eyes and determines that the viewer performs a reactive behavior to the video if the activity is matched with a behavior stored in a pre-stored template. For example, if two or more viewers face the same direction and the shapes of their lips change, then it is considered that the viewers are discussing something; if the palms of a viewer collide and separate continuously in a short period of time, then it is considered that the viewer is clapping; and if a plurality of viewers look towards the direction of a screen at the same time and the viewers keep looking for a period of time, then it is considered that the viewers are watching the screen. If a reactive behavior recognized in a period of time is kept for enough time at the viewer place, or the reactive behavior is kept for a short period of time but if percent of viewers performing the reactive behavior exceeds a certain threshold, then it is determined that the viewers at the viewer place make a reactive behavior and that the video played in the period of play time is a hotspot scene.

In an exemplary embodiment, the video sender summarizes, in real time, the result of the hotspot scene detection carried out at all viewer places. The period of play time of the video is determined as a hotspot scene of the video conference or living broadcasting once percent of viewer places where the period of play time of the video is judged as a hotspot scene exceeds a certain threshold (e.g., 80%) of all viewer places.

Figure 4:
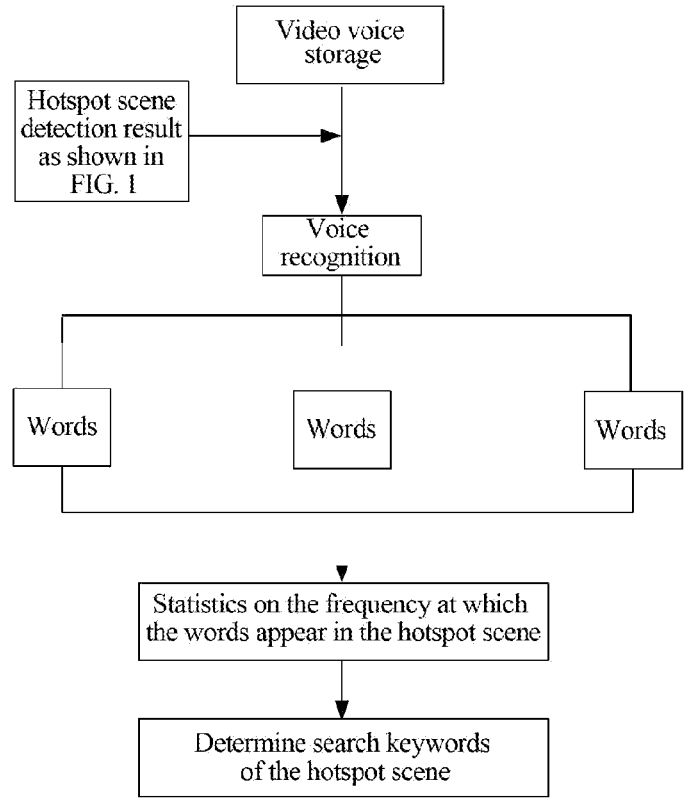
FIG. 4 is a flowchart 2 of a method for detecting a hotspot scene of a video conference according to an alternative embodiment of the present disclosure.

In an exemplary embodiment, as shown in FIG. 4, a video voice storage module is located in the server of the video sender or a video conference or live broadcasting, and is responsible for storing the voice data during a video conference or live broadcasting. After determining the video played in a certain period of play time as a hotspot scene, the video sender performs a voice recognition on the voice data stored of the period, and performs statistics on the total number of the words appearing in the period of play time and determines the 3-5 words appearing most frequently as search keywords of the video played in the period of play time.

Figure 5:
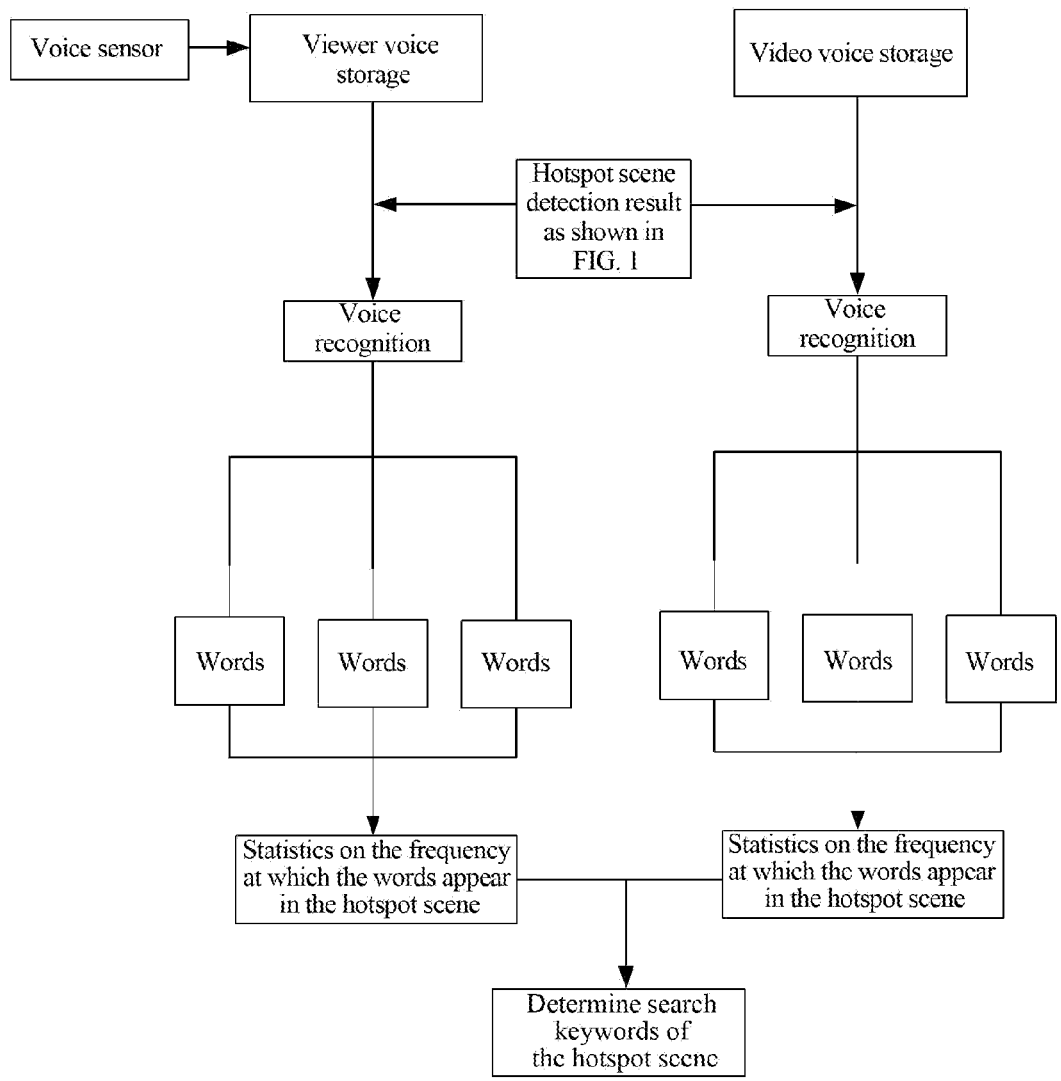
FIG. 5 is a flowchart 3 of a method for detecting a hotspot scene of a video conference according to an alternative embodiment of the present disclosure.

In an exemplary embodiment, as shown in FIG. 5, the voices of the viewers at a viewer place may also be collected by a voice sensor and stored in a viewer voice storage module. After determining the video played in a certain play time as a hotspot scene, the video sender sends the result of the detection to each viewer place, a system located at a viewer place is responsible for performing the voice recognition on the voice data in the period of play time, and making statistics on the total number of the words appearing in the period of play time and sending the result of the statistics to the video sender. The video sender compares a word statistic result recognized from the video voice storage with that submitted from each viewer place and selects the 3-5 words appearing most frequently as search keywords of the current hotspot scene.

Figure 6:
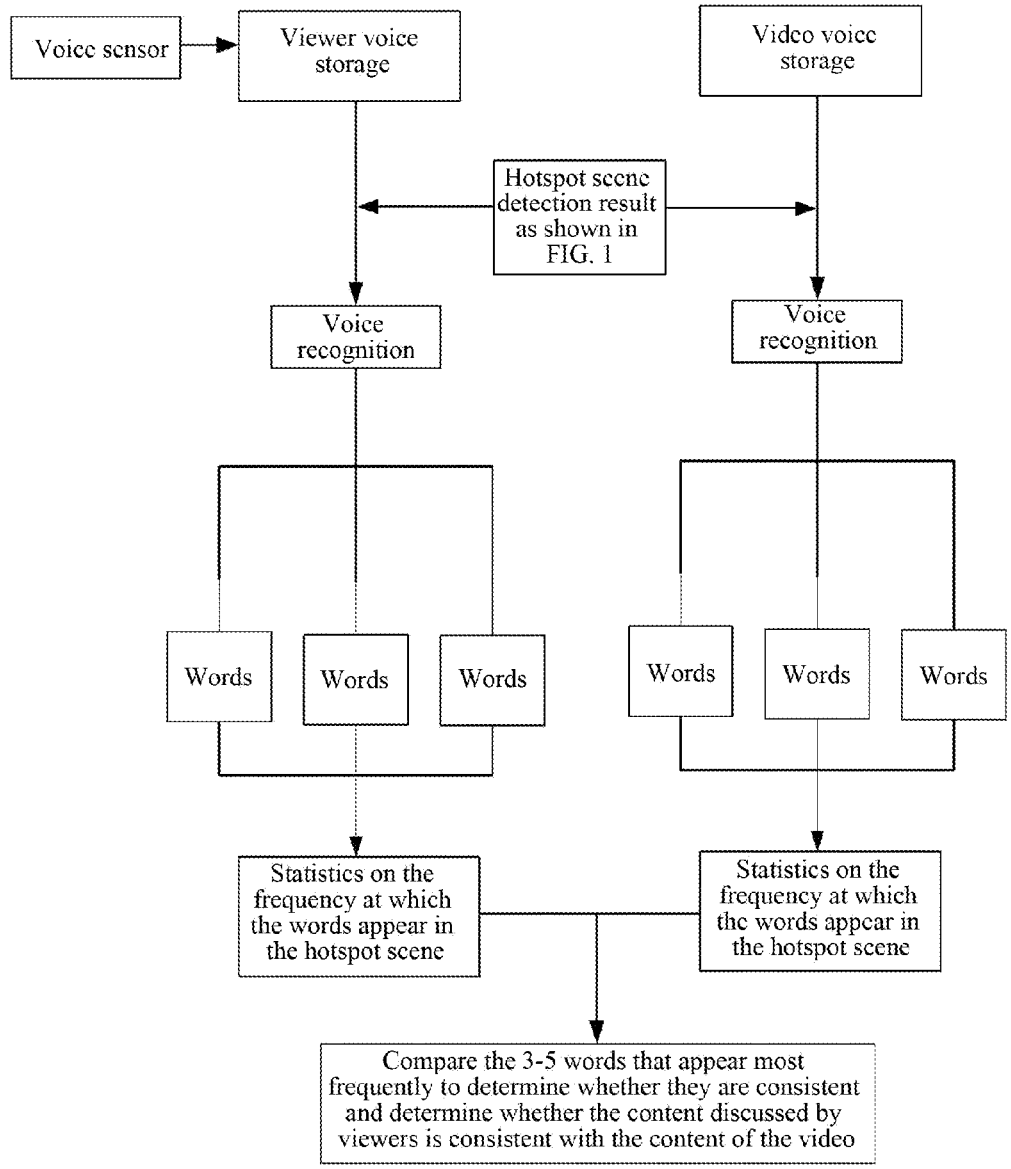
FIG. 6 is a flowchart 4 of a method for detecting a hotspot scene of a video conference according to an alternative embodiment of the present disclosure.

In an exemplary embodiment, as shown in FIG. 6, after determining the video played in a certain period of play time as a hotspot scene and obtaining search keywords of the hotspot scene, the video sender compares the search keywords with those submitted from each viewer place as search keywords of the reactive voices of the viewers at the viewer place in the certain period of play time. If the result of the comparison is that the 3-5 words appearing most frequently in the hotspot scene are consistent with those appearing most frequently in the reactive voices, then it is determined that a positive reaction to the video is made from the viewer places. The video sender summarizes the reactive behavior duration and the participant number submitted from each viewer place, during the period of play time of a hotspot scene, if the duration is relatively long or the participant number is relative large, then the video sender considers that a positive reaction to the video is made from the viewer places.

Figure 7:
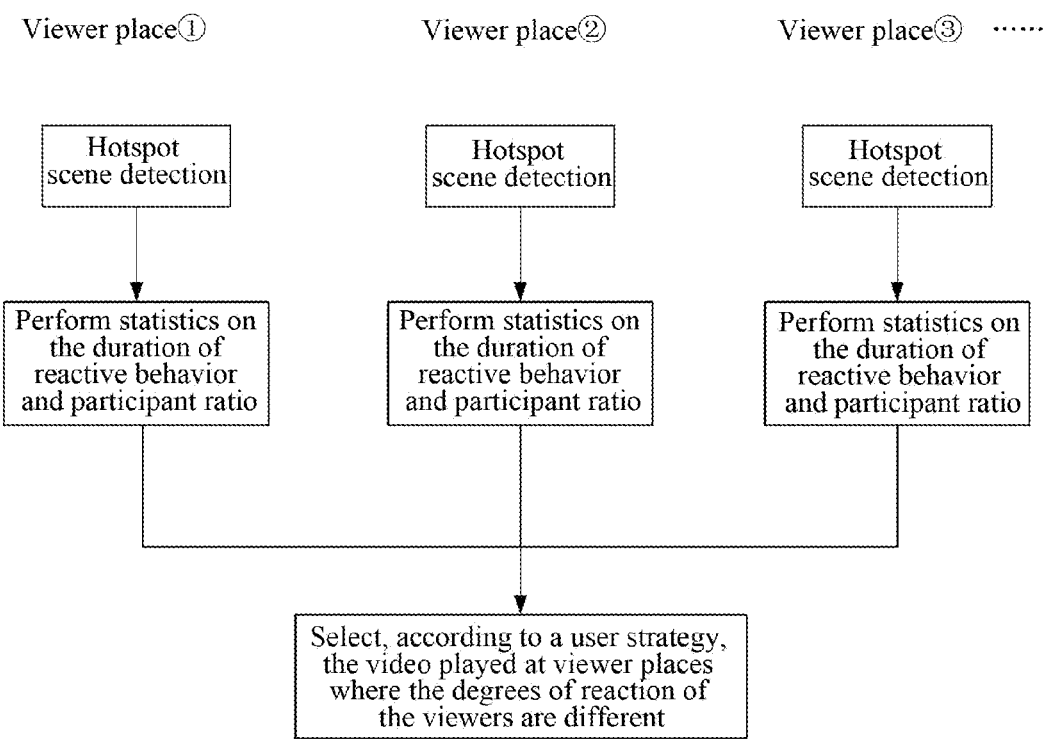
FIG. 7 is a flowchart 5 of a method for detecting a hotspot scene of a video conference according to an alternative embodiment of the present disclosure.

In an exemplary embodiment, as shown in FIG. 7, by using one of the foregoing two manners, the degree of reaction of the video viewers to a video can be obtained, and based on that, one or more viewers are selected and presented for the video sender. Herein, the forms of the presentation include: real-time text display, text log, a video record reflecting the viewers in the period of play time and real-time video display. The video sender may also select to show the viewers a video showing the viewers.

In conclusion, in the foregoing embodiments or alternative embodiments or alternative implementations of the present disclosure, behaviors of one or more video viewers are analyzed to recognize the reactions of the viewers to a video, for example, the discussion made by the viewers about the video, the stare of the viewers at the video or the handclap of the viewers for the video, etc., the video segment to which the viewers respond intensively is determined as a hotspot scene while the period of play time of the hotspot scene in the video is obtained. Then the voice recognition is performed on the audio data of the hotspot scene, the frequency at which each word recognized by the voice recognition appears is counted, and the words appearing frequently are determined as search keywords of the hotspot scene. In embodiments of the present disclosure, the reactions of video viewers to a hotspot scene are recognized, and by taking the reactions as a basis for judging a hotspot scene, a video conference or live broadcasting can be browsed quickly, the summary of the video conference or live broadcasting can be extracted quickly, and the video conference or live broadcasting can be retrieved quickly. Besides, the reactions of the viewers are presented for the current video sender in a proper way so that the video sender may know the reaction of the viewers directly.

Apparently, it should be understood by those skilled in the art that each module or step described herein can be realized by a universal computing device and that the modules or steps may be integrated on a single computing device or distributed on a network consisting of a plurality of computing device, in an exemplary embodiment, the modules or steps may be realized by executable program codes of computing device, thus, the modules or steps can be stored in a storage device so as to be executed by a computing device, or the modules or steps are respectively manufactured into integrated circuit modules, or several of the modules or steps are manufactured into single integrated circuit modules. Therefore, the present disclosure is not limited to the combination of specific hardware and software.

Although alternative embodiments of the present disclosure have been described above, it should be understood that the alternative embodiments are not intended to limit the present disclosure and that a variety of modifications and variations can be devised by those of ordinary skill in the art. Any modifications, equivalent substitution and improvements that can be devised without departing from the rule and principle of the present disclosure shall fall within the scope of protection of the present disclosure.

INDUSTRIAL APPLICABILITY

As stated above, the method and the apparatus for detecting a hotspot scene of a video conference provided here have the following beneficial effects: by determining a hotspot scene of a video played at video conference scene sites according to specific behavior of audience at the video conference scene sites, the method and the apparatus for detecting a hotspot scene of a video conference address the problem existing in the related technology that the identification of a hotspot scene consumes human cost, thereby improving the efficiency of hotspot scene identification.

What is claimed is:

1. A method for detecting a hotspot scene of a video conference, comprising:
  recognizing, by each of a plurality of video receivers, specific behavior of various viewers at a video conference site in real time according to video data played at the video conference site, and performing statistics, by each of a plurality of video receivers, on the specific behavior, wherein the specific behavior includes at least one of: a discussion behavior, a screen watching behavior and a handclap behavior;
  judging, by each of the plurality of video receivers, whether a frequency at which or a time length for which various viewers at the video conference site perform the specific behavior, exceeds a first preset value according to the statistics; and
  sending, by each of the plurality of video receivers, a period of play time of the video played at the video conference site, for which a result of the judgment is that the first preset value is exceeded, to a video sender; and determining, by the video sender, the hotspot scene of the video played according to a plurality of periods of play time sent by the plurality of video receivers.

2. The method according to claim 1, wherein determining, by the video sender, the hotspot scene of the video played according to a plurality of periods of play time sent by the plurality of video receivers comprises:
  receiving, by the video sender, the plurality of periods of play time sent by the plurality of video receivers;
  judging, by the video sender, whether a percent of video receivers sending an identical period of play time exceeds a second preset value; and
  sending, by the video sender, the identical period of play time to the plurality of video receivers when determining that a judgment result is that the second preset value is exceeded, wherein the video played in the identical period of play time is determined as the hotspot scene.

3. The method according to claim 2, wherein after the plurality of video receivers receive the identical period of play time, the method further comprises:
  performing a voice recognition, by the plurality of video receivers, on first voice data at video conference sites in the identical period of play time;
  performing statistics, by the plurality of video receivers, on the frequency at which each word recognized by the voice recognition appears in the first voice data at the video conference sites;
  and sending, by the plurality of video receivers, words, which appear in the identical period of play time at a frequency exceeding a third preset value, to the video sender as search keywords of the video played in the identical period of play time.

4. The method according to claim 2, wherein, the method further comprises:
  performing a voice recognition, by the video sender, on second voice data of the video played in the identical period of play time;
  performing statistics, by the video sender, on the frequency at which each word recognized by the voice recognition appears in the second voice data of the played video; and
  determining, by the video sender, the words which appear in the identical period of play time at a frequency exceeding a fourth preset value as search keywords of the video played in the identical period of play time.

5. The method according to claim 4, wherein after the video sender receives first search keywords sent by the plurality of video receivers and determines second search keywords according to the fourth preset value, the method further comprises:
  determining, by the video sender, words, which belong to both the first search keywords and the second search keywords, as the search keywords of the video played in the identical period of play time.

6. The method according to claim 1, wherein said judging, by each of the plurality of video receivers, whether the frequency at which or the time length for which various viewers at a video conference site perform the specific behavior, exceeds the first preset value according to the statistics comprises:

judging, by each of the plurality of video receivers, whether a duration of the specific behavior performed by the viewers at a video conference site and/or a percent of the viewers performing the specific behavior at the video conference site exceed/exceeds the first preset value.

7. The method according to claim 6, wherein, the method further comprises:
judging, by the plurality of video receivers, whether the duration of the specific behavior performed by the viewers at a video conference site or the percent of the viewers performing the specific behavior at the video conference site exceed/exceeds the first preset value respectively, and/or judging, by the plurality of video receivers, whether the duration of the specific behavior performed by the viewers at a video conference site or the percent of the viewers performing the specific behavior at the video conference site are/is smaller than a fifth preset value respectively; and
sending, by ones of the plurality of video receivers who obtain a following result, the video data or audio data played at video conference sites to the video sender: the duration of the specific behavior performed by the viewers at a video conference site or the percent of the viewers performing the specific behavior at the video conference site exceed/exceeds the first preset value, or the duration of the specific behavior performed by the viewers at a video conference site or the percent of the viewers performing the specific behavior at the video conference site are/is smaller than a fifth preset value.

8. The method according to claim 5, wherein the method further comprises:
judging, by the plurality of video receivers, whether the words, which appear in the first voice data at a frequency exceeding the third preset value, and the appearance frequencies thereof are matched with the words, which appear in the second voice data at a frequency exceeding the fourth preset value, and the appearance frequencies thereof, respectively;
judging, by the plurality of video receivers, whether the viewers at corresponding video conference sites make a positive reaction to the video played in the identical period of play time according to a result of the judgment; and
sending, by the plurality of video receivers, a result of the determination to the video sender.

9. An apparatus for detecting a hotspot scene of a video conference, comprising:
a processing module arranged to recognize specific behavior of various viewers at a video conference site in real time according to video data played at the video conference site and perform statistics on the specific behavior, wherein the specific behavior includes at least one of: a discussion behavior, a screen watching behavior and a handclap behavior;
a judgment module arranged to judge, according to the statistics, whether a frequency at which or a time length for which various viewers at the video conference site perform the specific behavior, exceeds a first preset value; and
a sending module arranged to send a period of play time of the video played at the video conference site, for which a result of the judgment is that the first preset value is exceeded, to a video sender, wherein the video sender determines the hotspot scene of the video played according to a plurality of periods of play time sent by a plurality of video receivers.

10. The apparatus according to claim 9, wherein the judgment module is also arranged to determine whether a duration of the specific behavior performed by the viewers at the video conference site and/or a percent of the viewers performing the specific behavior at the video conference site exceed/exceeds the first preset value.

11. The method according to claim 3, wherein, the method further comprises:
performing a voice recognition, by the video sender, on second voice data of the video played in the identical period of play time;
performing statistics, by the video sender, on the frequency at which each word recognized by the voice recognition appears in the second voice data of the played video; and
determining, by the video sender, the words which appear in the identical period of play time at a frequency exceeding a fourth preset value as the search keywords of the video played in the identical period of play time.

12. The method according to claim 11, wherein after the video sender receives first search keywords sent by the plurality of video receivers and determines second search keywords according to the fourth preset value, the method further comprises:
determining, by the video sender, words, which belong to both the first search keywords and the second search keywords, as the search keywords of the video played in the identical period of play time.

13. The method according to claim 12, wherein the method further comprises:
judging, by the plurality of video receivers, whether the words, which appear in the first voice data at a frequency exceeding the third preset value, and appearance frequencies thereof are matched with the words, which appear in the second voice data at a frequency exceeding the fourth preset value, and appearance frequencies thereof, respectively;
judging, by the plurality of video receivers, whether the viewers at corresponding video conference sites make a positive reaction to the video played in the identical period of play time according to a result of the judgment; and
sending, by the plurality of video receivers, a result of the determination to the video sender.

* * * * *